US011113594B2

(12) United States Patent
Ohodnicki et al.

(10) Patent No.: US 11,113,594 B2
(45) Date of Patent: Sep. 7, 2021

(54) MICROWAVE DIAGNOSTICS AND PASSIVE SENSORS FOR PIPELINE, WELL-BORE, AND BOILER-TUBE MONITORING

(71) Applicant: United States Department of Energy, Washington, DC (US)

(72) Inventors: Paul Ohodnicki, Allison Park, PA (US); Jagannath Devkota, Pittsburgh, PA (US); David W Greve, Sedona, AZ (US)

(73) Assignee: U.S. Department of Energy, Washington, DC (US)

( * ) Notice: Subject to any disclaimer, the term of this patent is extended or adjusted under 35 U.S.C. 154(b) by 78 days.

(21) Appl. No.: 16/504,774

(22) Filed: Jul. 8, 2019

(65) Prior Publication Data

US 2020/0012915 A1    Jan. 9, 2020

Related U.S. Application Data

(60) Provisional application No. 62/695,073, filed on Jul. 8, 2018.

(51) Int. Cl.
*H01Q 1/24* (2006.01)
*G06K 19/077* (2006.01)
*H01Q 9/04* (2006.01)
*G06K 7/10* (2006.01)

(52) U.S. Cl.
CPC ... *G06K 19/07786* (2013.01); *G06K 7/10346* (2013.01); *H01Q 1/247* (2013.01); *H01Q 9/0407* (2013.01)

(58) Field of Classification Search
CPC ............ H01Q 1/247; H01Q 9/0407; G06K 19/07786; G06K 7/10346
See application file for complete search history.

(56) References Cited

U.S. PATENT DOCUMENTS

2009/0273446 A1* 11/2009 Andrenko ............ G06K 19/077
340/10.1

* cited by examiner

*Primary Examiner* — Graham P Smith
(74) *Attorney, Agent, or Firm* — Timothy L. Harney; Michael J. Dobbs; Brian J. Lally (57) ABSTRACT

Materials, methods of making, and methods of using an integrated wireless detector for real time interrogating metallic tubular structures comprising: an RF patch antenna; a passive surface acoustic wave (SAW) sensor; and data analytic methodologies. An embodiment relates to interrogating a metallic structure having a uniform cross section using an antenna which launches electromagnetic radiation. A sensor may be located within the structure is configured to re-emit electromagnetic radiation modified depending on parameters for which the sensor has been functionalized. An antenna may receive radiation as modified by the sensor, or may receive the transmitted or backscattered radiation directly, without use of a sensor. The antenna then communicates wirelessly with an interrogator providing data which may be used to understand the operational status of the structure in real-time.

17 Claims, 7 Drawing Sheets

MICROWAVE DIAGNOSTICS AND PASSIVE SENSORS FOR PIPELINE, WELL-BORE, AND BOILER-TUBE MONITORING

CROSS REFERENCE TO RELATED APPLICATIONS

This application claims the benefit of and priority from U.S. Provisional Application No. 62/695,073 filed Jul. 8, 2018 the complete subject of which is incorporated herein by reference in its entirety.

STATEMENT OF GOVERNMENT SUPPORT

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments consistent with the present disclosure relate to a system and method of monitoring the interior of metallic tubular structures in real time using an integrated wireless system.

BACKGROUND

The disclosure provides a system and method for monitoring the interior of metallic tubular structures in real time using an integrated wireless system. More specifically, embodiments relate to monitoring the interior conditions of a pipe or tubular structure using a combination of the pipe or tubular structure as a wave guiding medium, integrated passive surface acoustic wave (SAW) sensors, integrated radio frequency (RF) patch antennas, and data analytic methodologies.

Safety and longevity is a major concern in fossil fuel industries and other technologies that use long metallic tubular structures (i.e., gas pipelines, wellbores, boilers, etc.). Conventional techniques for investigating the state-of-health and operational conditions of such tubular structures include non-destructive acoustic based techniques which are limited by the ability to interpret the data due to the fact that it is an indirect measurement which requires a model of the infrastructure under investigation. Real time monitoring of the tubular structures for multiple variables within them, including but not limited to corrosion, leaks, and mass flow, becomes crucial to ensure safety and cost-effective maintenance in timely manner.

It is known that electromagnetic radiation may propagate within metallic and tubular structures due to the structure acting as a waveguide. However, the set of propagating modes may be limited due to the characteristic dimensions and conductivity of the structure. Not all antennas can successfully launch and receive RF signals from metallic tubular structures at a frequency of interest or withstand internal conditions of the structure. For instance, an antenna which protrudes into the tubular structure may be a major issue for many applications where such protrusion can reduce the efficiency of the pipeline or boiler structure, likely resulting in a damaged or broken antenna, and preventing the ability to deploy in-line inspection techniques.

U.S. Pat. No. 7,526,944 to Sabata et al. discloses a wireless pipeline monitoring system for detecting corrosion and leaks. Sabata does not disclose a source of electromagnetic radiation. The system requires internal batteries for operation. The sensors are connected to a power source.

U.S. Pat. No. 8,855,947 to Sheila-Vadde et al. discloses a patch antenna for use in a pipe. The antenna is used for multiphase flow metering and monitoring is limited to specific characteristics of the flow material. The patent provides for determining permittivity by measuring transmission, reflection, or resonance of the wave.

These and other objects, aspects, and advantages of the present disclosure will become better understood with reference to the accompanying description and claims.

SUMMARY

Embodiments of the present invention relate to using a patch antenna in an integrated system for radio-frequency (RF) launching and receiving and powering the passive sensors at the interior of a metallic tubular structure.

One embodiment relates to an integrated wireless detector for interrogating one or more metallic tubular structures. The integrated wireless detector comprises a metallic tubular structure; an antenna configured to operate in a radio or microwave frequency range which propagates electromagnetic radiation within the metallic tubular structure; a detector at the interior of the metallic tubular structure which is passive and wireless, where the electromagnetic radiation excites and interrogates the detector and the detector re-emits electromagnetic radiation to be received at an antenna; an interrogator that receives data from an antenna and processes the data.

A method of interrogating metallic tubular structures, the method comprising providing a passive, wireless sensor, integrating the sensor at the interior of the metallic tubular structure, propagating electromagnetic radiation within the guided modes of the metallic tubular structure using an engineered antenna integrated into the tubular structures, exciting and interrogating the sensor with the propagating electromagnetic radiation, and receiving electromagnetic radiation from said sensor at the same or another antenna integrated within the structure.

Another embodiment relates to a monitoring system comprising the antenna and telemetry designs similar to that described herein for monitoring the launched RF/microwaves in either a transmitted or backscattered configuration, typically with a sensor, and data analytics for understanding electromagnetic losses in real time due to changes in internal structural health of the tubular structures providing a means to monitor interior conditions of the structures. In such embodiments, information can be derived through monitoring the changes in transmitted or reflected RF signals without the need for localized sensors. Distributed information along the length of the tubular structure may also be possible to derive through techniques such as time domain reflectometry.

BRIEF DESCRIPTION OF THE DRAWINGS

These and other features, aspects, and advantages of the multiple embodiments of the present invention will become better understood with reference to the following description, appended claims, and accompanied drawings where:

FIG. 5A depicts a graph illustrating impedance as a function of θ.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide description using antenna, such as patch, helical and/or conformal coaxial antenna for example, in the integrated system for radio-frequency (RF) launching and receiving with passive surface acoustic wave (SAW) sensors at the interior of a metallic tubular structure.

Metallic tubular structures act as waveguides for RF/microwave electromagnetic radiation and allow the waves to propagate relatively long distances within them due to the high electric conductivity combined with a set of characteristic dimensions which are favorable for wave-guiding of a limited set of propagating modes. It should be appreciated that the term tubular structure as used herein includes any structure having a generally circular, square, or rectangular cross-section, including but not limited to pipes, ducts, wellbores, and the like. The tubular structure may also include valves, welds, demountable joints and the like. Such properties of metallic tubular structures provide an opportunity to use the structure as a communication means for distant sensors installed within the structure to monitor localized conditions and/or monitor the internal of the structure directly through the transmitted and/or backscattered electromagnetic waves launched within them.

In an embodiment of the present system, RF or microwave electromagnetic radiation is launched through an antenna structure within a metallic tubular structure, such as a pipeline, wellbore, natural gas pipeline, boiler tube, or the like. The propagating RF and microwave electromagnetic radiation may be leveraged within the tubular structure for communication and telemetry with detectors or passive wireless sensors, such as a SAW sensor device, for monitoring localized properties. Preferably, the antenna and sensor are integrated internally to the tubular structures to provide more direct information about the state of health and operational conditions.

Data representing the internal conditions of the tube may be received at an interrogator allowing for real-time monitoring of internal conditions. Measured signals, combined with data and signal processing, may be linked to features of the interior tubular structural health and provide operators with early and real-time knowledge of undesirable conditions before they result in failures. For example, results may indicate localized scaling within boiler tubes, partial blockages of pipelines and boiler tubes, presence of condense water within pipelines, or other issues. Embodiments described herein relate to an autonomous wireless system that monitors parameters of interest within pipelines, comprising an optimally designed antenna such as patch, helical and/or conformal coaxial antenna for example, passive and wireless SAW sensor tags, and data analytics.

Figure 1:
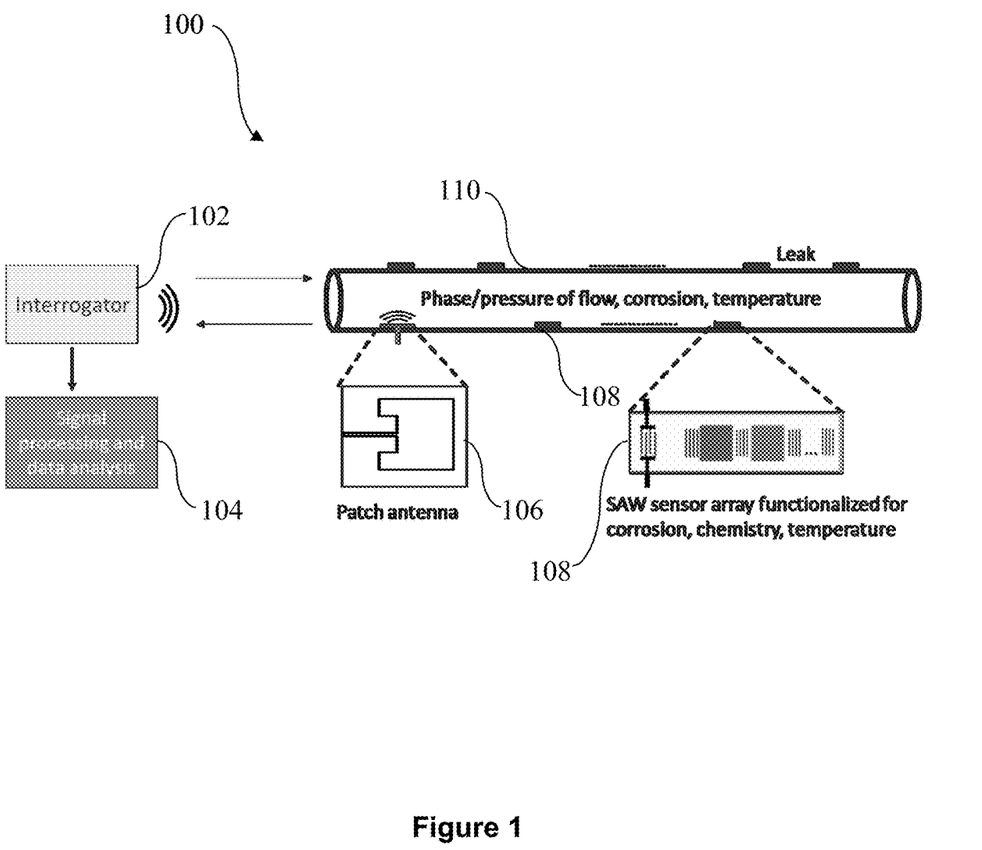
FIG. 1 depicts a schematic of a pipeline monitoring system.

FIG. 1 depicts one embodiment of a pipeline monitoring system 100 using a combination of one or more passive SAW sensors 108, patch antenna 106, and data analytics for microwave diagnostic and sensing within a pipe 110. The pipe 110 may act as a waveguide for RF and microwave electromagnetic radiation due to the high electronic conductivity combined with a set of characteristic dimensions which are favorable for wave-guiding of a limited set of propagating modes. The patch antenna 106 communicates with the interrogator 102, preferably through wireless communication, and launching electromagnetic waves into the pipe 110.

The propagated waves excite the SAWs, the propagation velocity and amplitude of the excited waves on the SAW device depend on the physical parameters (e.g., temperature, pressure, strain) and/or other parameters for which the SAW device has been functionalized (e.g., chemistry, corrosion on-set, condensed water). The SAW sensor 108 then re-emits the excited wave with a modification in (1) amplitude, (2) phase, and/or (3) frequency spectrum, which is subsequently received at a patch antenna 106. The interrogator 102 is in data communication with patch antenna 106 and an external device 104. The external device 104 may process the signal from the patch antenna 106 and provide real-time data of the internal conditions of the pipe 110 at the location of the SAW sensor 108.

Preferably, a wireless system for interior part monitoring of the pipes comprises efficient launching and reception of the RF signals within the pipes, and identification of suitable sensors to use at the interior of the pipes. In one embodiment, multi-parameters sensitive wireless and passive sensors may be powered and operated using the RF waves. Typically, data analytics techniques may also be used to identify optimal sensor selection and placement. Data analytics techniques may also be used to leverage the information gathered through a sensor network in order to generate information useful for understanding the real-time operational status.

In alternate embodiments, the pipeline monitoring system 100 may be used in fossil power generation, resource recovery, or resource transportation, with RF/microwave launch and collection systems, such as a patch antennae array, and passive wireless sensors, such as SAW devices, functionalized for parameters of interest.

Figure 2:
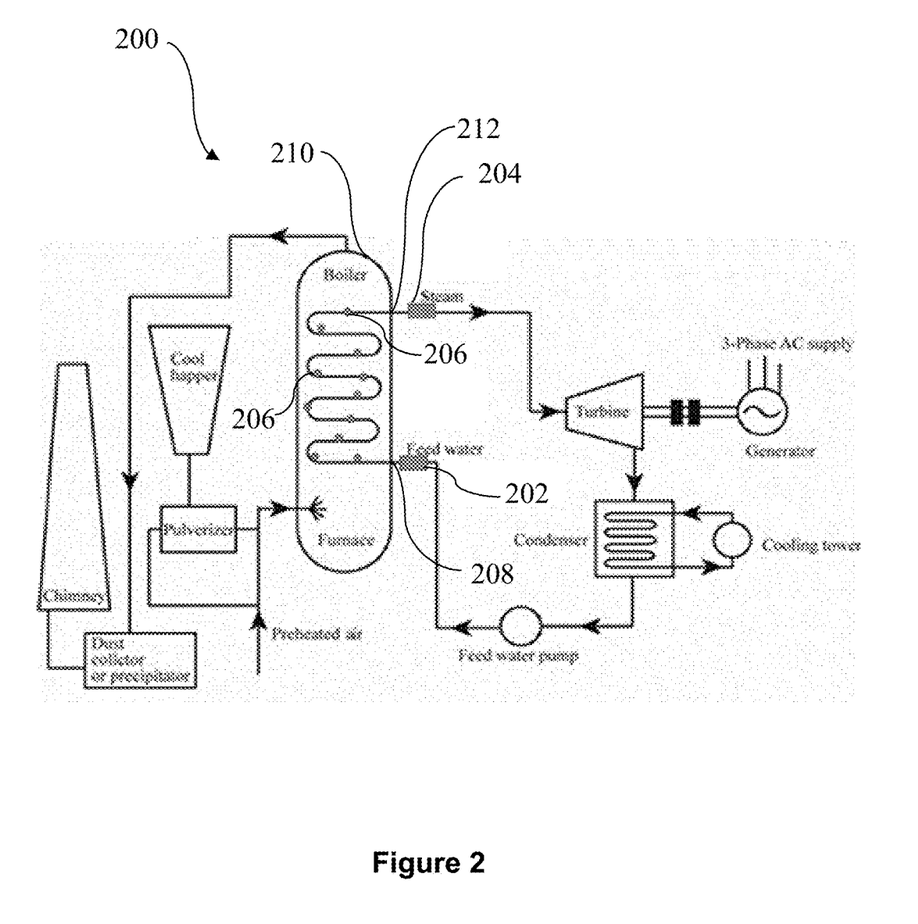
FIG. 2 depicts a coal boiler asset health monitoring system.

An embodiment of the present system may be a coal-boiler asset health monitoring system. FIG. 2 depicts one embodiment of a coal boiler asset health monitoring system 200. RF or microwave launching and detection may occur at both the inlet 208 of the feed water of boiler 210 at a first antenna 202 and the outlet 212 of the steam at a second antenna 204. One or more low cost passive wireless sensors 206 may be embedded throughout the interior of boiler tube for information on the interior conditions of the boiler tube. In one embodiment, the passive wireless sensors 206 may be multifunctional. The sensors may be interrogated at the frequencies of interest.

The telemetry system used for launching and receiving RF or microwaves within a confined metallic tubular structure may comprise an antenna. The antenna may also be used for communicating with distant sensors inside the metallic tubular structures and with the interrogator systems.

An embodiment of the present invention integrates advanced antenna and telemetry designs with metallic tubular structures for efficient coupling of propagating RF and microwave electromagnetic radiation within the guided modes of the structure. Preferably, the antenna and telemetry design includes patch antennas or patch antenna arrays. The antenna, or antenna arrays, are integrated with metallic tubular structures which may comprise boiler tubes, pipelines, and wellbores. Integration of the antenna allows for efficient coupling of propagating RF/microwave electromagnetic radiation within the guided modes of the structure.

Antenna and telemetry designs similar to that described herein may also be employed for RF/microwave detection and with an interrogator system. This detection system allows for efficient monitoring of launched electromagnetic radiation in either a transmitted or backscattered configuration. In an embodiment, detection and analytics of the propagated radiation in a transmitted or reflected geometry may include signal processing approaches that allow for understanding losses in propagation and backscattered electromagnetic radiation, such as Time Domain Reflectometry for example.

In another embodiment, the RF/microwave signals, which are excited into metallic tubular structures via an antenna and telemetry design and detected in either a transmitted or backscattered configuration, can be analyzed for loss and phase change and correlated with the interior structural health of the structures thereby enabling the technique to monitor the interior of the structures without the requirement of communication with internal deployed sensors.

The following embodiments relate to antennas for launching the lowest waveguide mode (TE11) in a circular pipe and attenuation of a wave after launching, although alternate parameters may be apparent to those skilled in the art. In one embodiment, the cylindrical pipe is stainless steel (resistivity $1.6 \times 10^{-7}$ Ohm-m) with diameter 7 cm. In this geometry, TE11 and TE01 are the dominant and next highest modes for which the cut off frequencies are 2.52 GHz and 5.23 GHz, respectively and the attenuations due to conductor loss are 0.1387 dB/m (for 2.6 GHz) and 0.2374 dB/m (for 5.3 GHz), respectively.

Figure 3A:
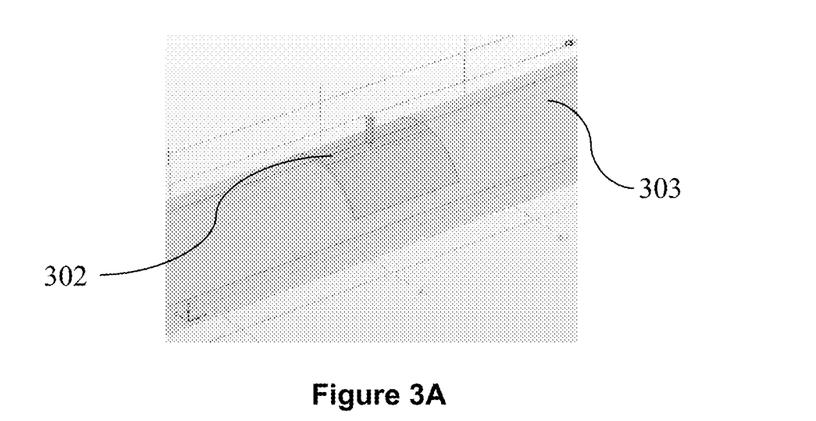
FIGS. 3A-C depict perspective views of three types of launchers for TE11 in a cylindrical pipe.
Figure 3B:
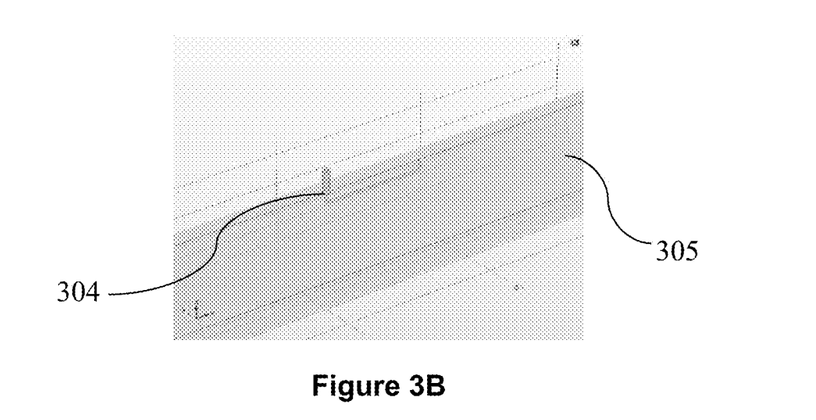
Figure 3C:
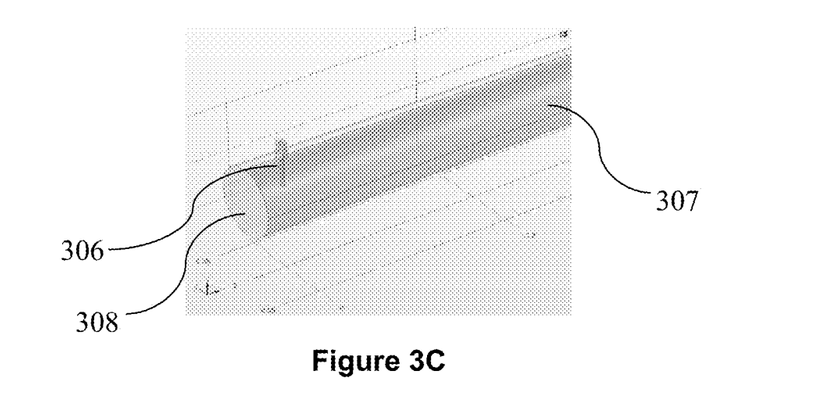

FIGS. 3A, 3B, and 3C depict three types of launchers for TE11 in the cylindrical pipe. One embodiment of the launcher is a patch antenna 302 in a cylindrical pipe 303, depicted in FIG. 3A. A patch antenna 302 on the inner surface of a cylindrical pipe 303 may have good performance and nearly zero penetration into the cylindrical pipe 303.

A patch antenna, having a strip transmission line approximately one-half wavelength long above a ground plane, may be preferable because it may radiate in either direction of the pipes. With respect to placement of the launcher, it is desired that one or more antennas may be placed at arbitrary locations in a long pipe. The patch antenna may be used in arbitrary locations on the inner surface and have nearly zero penetration into the pipe. One embodiment may include a patch antenna with a single patch. In another embodiment, patch antennas may be designed in an array form to increase the gain and directional radiation needed.

An alternate embodiment of a launcher is a loop antenna 304 in a cylindrical pipe 305, depicted in FIG. 3B. A loop antenna 304 may have an inductive input impedance and may be matched well with a series capacitor. A loop antenna 304 may have the characteristic of emission primarily in one direction, and may penetrate into the cylindrical pipe 305.

An alternate embodiment of a launcher is a quarter wavelength long probe 306 in a cylindrical pipe 307, depicted in FIG. 3C. A probe approximately one quarter wavelength long may have a reasonable input impedance only when proximate a capped pipe end 308.

Figure 4A:
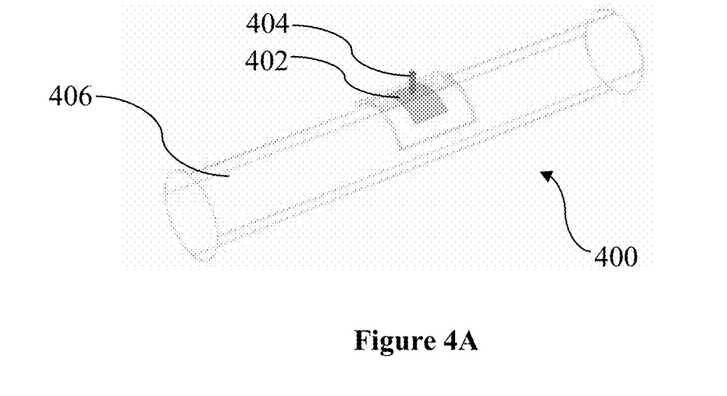
FIG. 4A depicts a perspective view of a feed arrangement from a coaxial cable and variables for patch simulations.
Figure 4B:
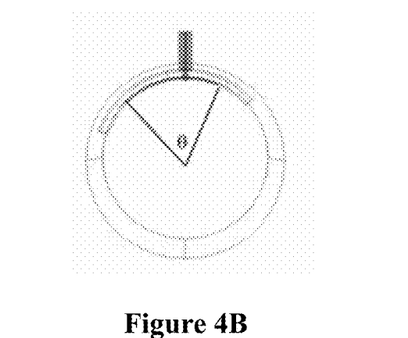
FIGS. 4B-C depict cross sectional views of a feed arrangement from a coaxial cable and variables for feed placement.
Figure 4C:
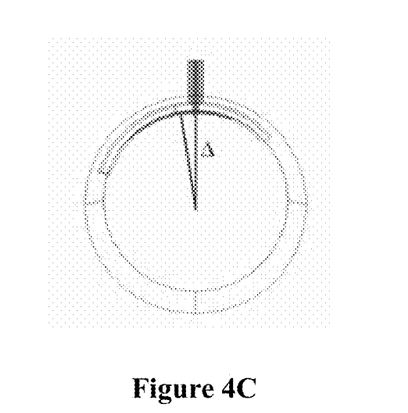
Figure 5B:
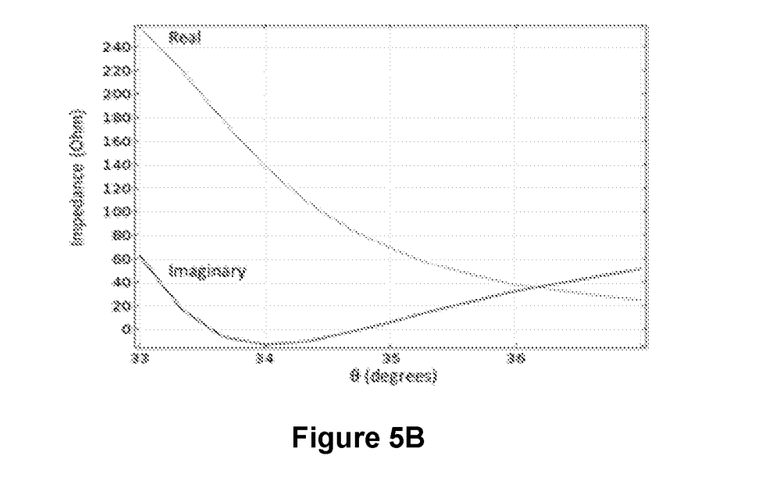
FIG. 5B depicts magnetic and electric fields near a patch launcher.

FIGS. 4A, 4B, and 4C depict one embodiment of a feed arrangement from a coaxial cable and related variables for embodiments of a patch antenna launcher, as described in FIG. 3A. FIG. 4A depicts an embodiment of a patch launcher 400. In the patch launcher 400, the feed 404 may extend from the back of the patch antenna 402 and is placed symmetrically along the axis of the pipe 406. The feed 404 may be placed off-center in the transverse direction, resulting in a fringing electric field transverse to the pipe axis that couples efficiently to the transverse electric field of the TE11 circular waveguide mode. FIG. 5B further describes the fields near a patch launcher. In one embodiment, the length of the patch launcher 402 along the axis and the insulator thickness may be fixed.

FIG. 4B depicts the total angular size of the patch, θ. FIG. 4C depicts the off-set of the feed from the patch center, Δ. In one embodiment, the patch launcher may have an operating frequency 2.6 GHz, a dielectric material with permittivity 2.0 and the thickness 0.3 cm, input impedance 86+0j Ohm, extent θ=35 degrees, and off-set Δ=12 degrees. Impedance is further described in FIG. 5A. In an alternate embodiment, the patch antennas and SAW sensors may have a different operating frequency; the operating frequency may be based on the waveguide mode in a pipeline.

FIG. 5A depicts a graph illustrating impedance as a function of θ when Δ=12 degrees. More specifically, FIG. 5A illustrates the simulated impedance at the coaxial drive port as a function of the patch extent θ. The impedance has a zero imaginary part and a real part of 86 Ohms for θ~34.6 degree, a fair match for a 50 Ohm coaxial system. In one embodiment, the terminal impedance may be closer to 50 Ohms.

FIG. 5B depicts an embodiment of the fields within a pipe, near a patch launcher: (blue arrows) magnetic field in the transverse plane; (red arrows) electric field, and (color) y component of the electric field. The structures of the electric and magnetic fields depicted are TE11 mode (the dominant mode). The minimum attenuation of this mode in the considered pipe is 0.1387 dB/m as dictated by the finite conductivity. There may be losses due to other factors such as dielectric medium filling the space and the roughness of the conducting walls.

Passive and wireless sensors are used at the interior of a metallic tubular structure which may monitor conditions inside the structure. Integrated multi-functional and passive RF sensors may be interrogated at frequencies of interest. It is desired that the sensors are stable over a range of environmental conditions within the pipe.

The sensors are excited by the propagating RF/microwave electromagnetic radiation and preferably operate without a battery (passive sensor). In one embodiment, wireless and passive sensors sensitive to multi-parameters are powered and operated using the RF waves. The integration of passive, wireless sensors within the tubular structures enables monitoring of local conditions (e.g. temperature, pressure, corrosion, phase chemistry, leak, and the like). In some embodiments, the sensor chip may consist of an array of devices functionalized for various parameters and chemical species.

Figure 6A:
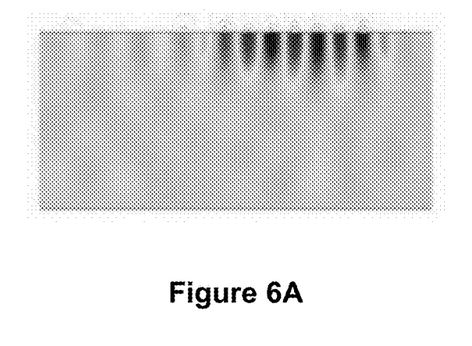
FIG. 6A depicts surface acoustic waves excited on a piezoelectric device using interdigitated electrodes.
Figure 6B:
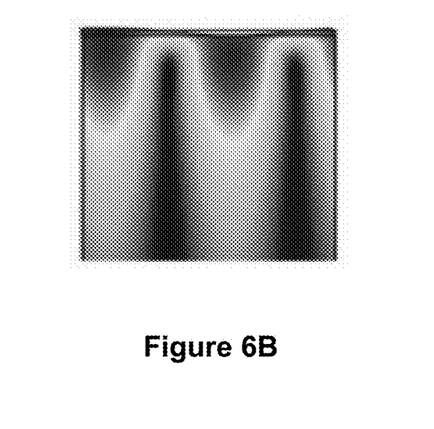
FIG. 6B depicts surface displacements on a sensing layer-coated a device with SAW excitation.
Figure 6C:
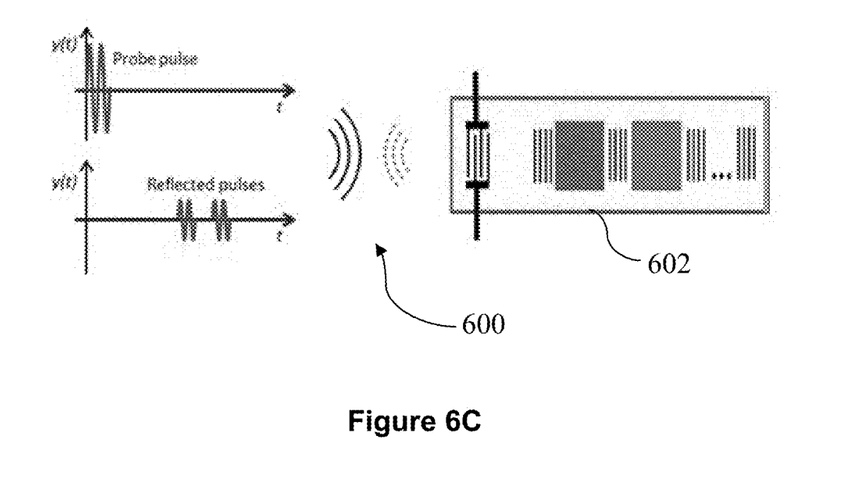
FIG. 6C depicts an arrangement for remote monitoring of a SAW sensor array.

For example, SAW sensor arrays may be used for real-time monitoring of parameters within the tubular structure, as described in FIGS. 6A-6C.

In one embodiment, the sensor may be surface acoustic wave (SAW) sensors. SAW sensors are capable of operating wirelessly and passively (without batteries). The SAW devices may include a delay line or resonator in configuration. The SAW sensors may be sensors with micron-sized features and high stability which are sensitive to various physical parameters and chemical species when coated with proper sensing materials.

The RF signals propagated into the pipes may excite SAWs on a piezoelectric substrate. FIG. 6A depicts surface displacements with excitations of acoustic waves on a plain piezoelectric material, as obtained by finite element simulation. In an embodiment, surface acoustic waves are excited on a piezoelectric device using interdigitated electrodes. FIG. 6B depicts surface displacements with excitations of surface acoustic waves on a sensing layer-coated SAW device, as obtained by finite element simulation.

The propagation velocity and amplitude of the excited waves may depend on the physical parameters (e.g. temperature, pressure, strain) or surface overlayer's mass, elasticity, or conductivity. Consequently, a change in physical environment or the overlayer's properties may fundamentally induce a change in the wave velocity and amplitude which may be measured in terms of frequency/phase or attenuation and related to the original cause.

SAW sensors comprise micro-transponder devices that may provide monitoring of various physical parameters, including but not limited to: temperature, pressure, strain, chemical species, and corrosion. In one embodiment, a sensor chip may include a single SAW device. In another embodiment, a sensor chip may include an array of SAW devices functionalized for various parameters and chemical species. In some embodiments, the SAW device may include a sensing overlayer to detect certain chemical species. The sensing overlayer may comprise polymers, metal oxides, conducting metal oxides, zeolites, metal-organic frameworks, metals, and the like.

In an embodiment, surface acoustic waves may be excited in these devices and provide information which is then received wirelessly after the RF/microwave signal is re-emitted by the device. FIG. 6C is a schematic 600 of an arrangement for remote monitoring of a SAW sensor array 602. The SAW sensor array 602 may be functionalized to monitor the parameters of interest remotely In one embodiment, the SAW sensor array 602 may be used as wireless sensors for real-time monitoring of parameters of interest inside pipelines. For pipeline applications, an array of SAW sensors may be developed in a single chip and operated using single RF excitation for monitoring multiple variables, which may include pressure and composition of mass flow, corrosion rate, and leaks, amongst others. The obtained data may be integrated within an appropriate data analytical modeling tool or system to allow for real-time monitoring and identification of failures or incidents before they occur at the interior of the pipelines.

One embodiment of the present invention may allow for early detection of potential failures before the failures occur and implementation of condition-based maintenance procedures. The performance of these diagnostic approaches and sensors may depend on the RF/microwave interrogation technology, the detailed sensors, the efficiency of the antennas used to communicate with external electronics, and signal processing for a particular application. Data analytics techniques may be used to identify optimal sensor selection and placement, as well as to leverage the information gathered through a sensor network in order to provide information about the real-time operational status.

The real-time monitoring of tubular structures generates a large amount of data over time, which may be stored for statistical modeling and data analysis of the structures. The amount of information extracted and derived from data of the collected RF/microwave signals may depend on the signal processing and data analytic methods employed. In one embodiment, the sensor output may be used to create a data base. A data base of the response of the proposed sensor system may be integrated with statistical modeling and data analytic methodologies to provide information which is used to identify potential failures prior to their occurrence.

Figure 7A:
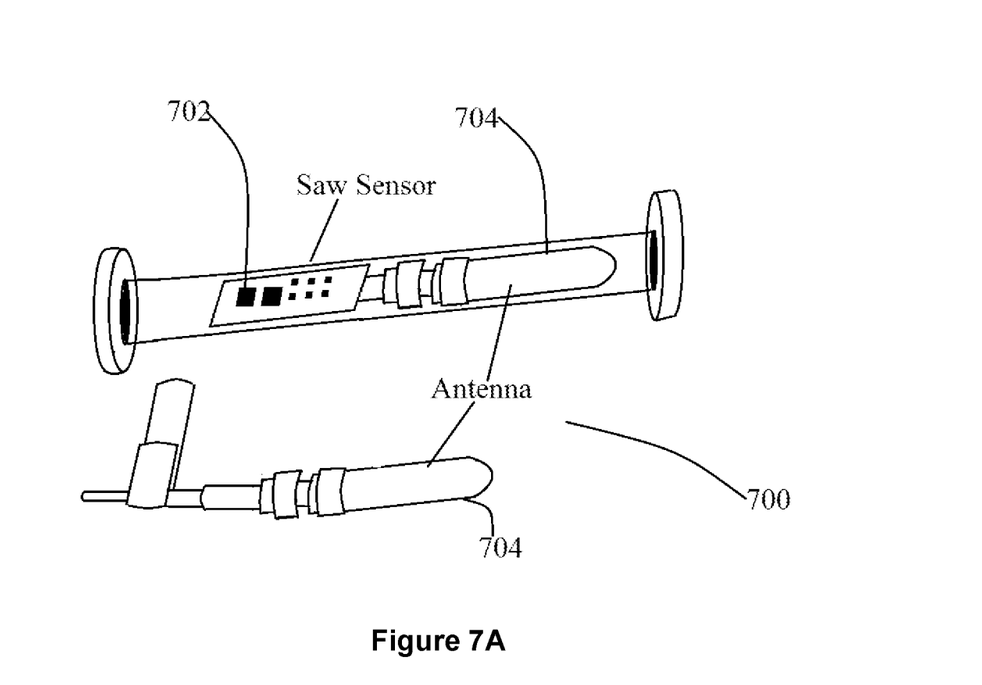
FIG. 7A depicts a wireless measurement setup of a SAW delay line in a gas flow cell.
Figure 7B:
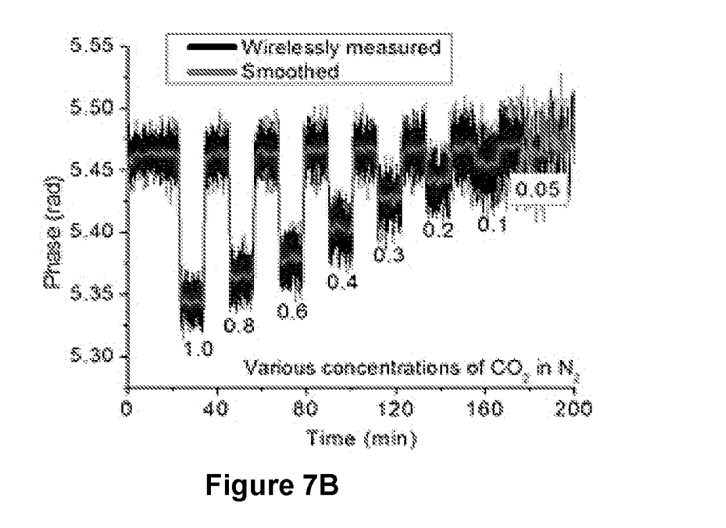
FIG. 7B depicts a graph of the response of a ZIF-8 coated SAW delay line to $CO_2$ as measured wirelessly.

FIG. 7A depicts a photograph of an experimental setup 700 for wireless measurement of SAW sensor 702 response using a set of commercial antennas 704. In one embodiment, the SAW sensor 702 may be used to measure temperature, pressure or other physical parameters. Further, the sensor may also be used to measure chemical species if functionalized with a chemical-selective material. For example, FIG. 7B depicts the wirelessly measured real time response of a SAW sensor coated with a carbon dioxide-selective metal-organic framework (ZIF-8) to various concentrations of $CO_2$ after compensating the temperature and other environmental effect.

Embodiments of the present system, including data analytics methodologies, may provide a broad range of information about the structure in question which may include, but is not limited to: localized scale spallation, partial blockages, the presence of condensed water phase, early on-set of corrosion, the presence of chemical species closely linked with corrosion, and the like. Specific embodiments of the present system may reduce the cost of natural resource transportation and recovery and enable more efficient power generation while maintaining a safe environment.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance.

It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

We claim:

1. An integrated wireless detector for interrogating one or more metallic tubular structures, said integrated wireless detector comprising:
   a metallic tubular structure, wherein the cross section of said metallic tubular structure is approximately uniform;
   an antenna, wherein said antenna is configured to operate in a radio or microwave frequency range, wherein said antenna propagates electromagnetic radiation within said metallic tubular structure;
   a sensor comprising a surface acoustic wave sensor at the interior of said metallic tubular structure wherein said sensor is passive and wireless, wherein said electromagnetic radiation excites and interrogates said sensor, wherein said sensor re-emits electromagnetic radiation, wherein said antenna receives said re-emitted electromagnetic radiation; and
   an interrogator, wherein said interrogator receives data from said antenna, wherein said interrogator processes said data.

2. The integrated wireless detector of claim 1, wherein said metallic tubular structure is a pipe.

3. The integrated wireless detector of claim 1, wherein said metallic tubular structure is a boiler tube.

4. The integrated wireless detector of claim 1, wherein said metallic tubular structure is a wellbore.

5. An integrated wireless detector for interrogating metallic tubular structures, said integrated wireless detector comprising:
   a metallic tubular structure;
   a patch antenna, wherein said patch antenna is configured to operate in a radio or microwave frequency range, wherein said patch antenna propagates electromagnetic radiation within said metallic tubular structure and receives electromagnetic radiation;
   a sensor comprising a surface acoustic wave sensor integrated at the interior of said metallic tubular structure, wherein said sensor is passive and wireless, wherein said electromagnetic radiation excites and interrogates said sensor, wherein said patch antenna receives said electromagnetic radiation; and
   an interrogator, wherein said interrogator receives data from said patch antenna, wherein said interrogator processes said data.

6. The integrated wireless detector of claim 5, wherein said patch antenna launches said electromagnetic radiation in a transmitted configuration.

7. The integrated wireless detector of claim 5, wherein said patch antenna launches said electromagnetic radiation in a backscattered configuration.

8. The integrated wireless detector of claim 5, wherein said metallic tubular structure is a pipe.

9. The integrated wireless detector of claim 5, wherein said metallic tubular structure is a boiler tube.

10. The integrated wireless detector of claim 5, wherein said metallic tubular structure is a wellbore.

11. A method of interrogating metallic tubular structures, said method comprising:
   providing a sensor, wherein said sensor is passive, wireless, and configured to monitor a parameter of a metallic tubular structure;
   integrating said sensor at the interior of said metallic tubular structure;
   propagating electromagnetic radiation within the guided modes of said metallic tubular structure using an integrated antenna;
   exciting and interrogating said sensor with said propagating electromagnetic radiation; and
   receiving electromagnetic radiation emitted by said sensor at an integrated antenna.

12. An integrated wireless detector for interrogating one or more metallic tubular structures, said integrated wireless detector comprising:
   a metallic tubular structure, wherein the cross section of said metallic tubular structure is approximately uniform;
   a patch antenna, wherein said patch antenna is configured to operate in a radio or microwave frequency range, wherein said patch antenna propagates electromagnetic radiation within said metallic tubular structure;
   a detector at the interior of said metallic tubular structure wherein said detector is passive and wireless, wherein said electromagnetic radiation excites and interrogates said detector, wherein said detector re-emits electromagnetic radiation, wherein said patch antenna receives said re-emitted electromagnetic radiation; and
   an interrogator, wherein said interrogator receives data from said patch antenna, wherein said interrogator processes said data.

13. The integrated wireless detector of claim 12, wherein said patch antenna launches said electromagnetic radiation in a transmitted configuration.

14. The integrated wireless detector of claim 12, wherein said patch antenna launches said electromagnetic radiation in a backscattered configuration.

15. The integrated wireless detector of claim 12, wherein said metallic tubular structure is a pipe.

16. The integrated wireless detector of claim 12, wherein said metallic tubular structure is a boiler tube.

17. The integrated wireless detector of claim 12, wherein said metallic tubular structure is a wellbore.

* * * * *